US012220793B2

(12) United States Patent
Tettamanti et al.

(10) Patent No.: US 12,220,793 B2
(45) Date of Patent: Feb. 11, 2025

(54) CLAMPING TOOL WITH INTERCHANGEABLE ARM

(71) Applicant: ATLAS COPCO INDUSTRIAL TECHNIQUE AB, Stockholm (SE)

(72) Inventors: Oscar Tettamanti, San Fermo Della Battaglia (IT); Massimiliano Cattaneo, Carate Brianza (IT)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 247 days.

(21) Appl. No.: 17/779,245

(22) PCT Filed: Dec. 17, 2020

(86) PCT No.: PCT/IB2020/062088
§ 371 (c)(1),
(2) Date: May 24, 2022

(87) PCT Pub. No.: WO2021/124182
PCT Pub. Date: Jun. 24, 2021

(65) Prior Publication Data

US 2022/0410355 A1 Dec. 29, 2022

(30) Foreign Application Priority Data

Dec. 19, 2019 (IT) ........................ 102019000024742

(51) Int. Cl.
*B25B 23/142* (2006.01)
*B25B 23/00* (2006.01)

(52) U.S. Cl.
CPC ...... *B25B 23/1425* (2013.01); *B25B 23/0035* (2013.01); *B25B 23/0042* (2013.01)

(58) Field of Classification Search
CPC ...... B25B 23/142; B25B 23/1425; G01L 5/24
See application file for complete search history.

(56) References Cited

U.S. PATENT DOCUMENTS 3,995,477 A * 12/1976 Almond .............. B25B 23/1425 73/862.26
4,397,196 A * 8/1983 Lemelson ........... B25B 23/1425 702/43

(Continued)

FOREIGN PATENT DOCUMENTS

DE 20 2004 003 978 U1 7/2004
DE 20 2004 017 879 U1 2/2005

(Continued)

OTHER PUBLICATIONS

International Search Report issued Feb. 18, 2021 in PCT/IB2020/062088 filed on Dec. 17, 2020, 4 pages.

(Continued)

*Primary Examiner* — David B. Thomas
(74) *Attorney, Agent, or Firm* — Oblon, McClelland, Maier & Neustadt, L.L.P.

(57) ABSTRACT

A clamping tool is provided comprising a body, containing control circuits and electronic processing circuitry and having, at one end, a handle for gripping by an operator making the clamping, and on the other end, an arm. The arm comprises, at its free end, a seat that can be alternatively pluggable to a plurality of inserts suitable for engaging the tool with a corresponding type and/or dimension of a mechanical member on which the tool is configured to operate to perform a clamping operation. Sensor means are provided on the arm for detecting tightening conditions exerted on the mechanical member. Furthermore, a microprocessor electronic card is provided on the arm for receiving analogic signals from the sensor means, converting the signals into digital format, and handling transfer of the signals in digital format to the electronic processing circuitry.

5 Claims, 1 Drawing Sheet

(56) References Cited

U.S. PATENT DOCUMENTS

| | | | | |
|---|---|---|---|---|
| 4,522,075 | A | 6/1985 | Pohl | |
| 4,864,841 | A * | 9/1989 | Heyraud | B25B 23/1425 73/862.21 |
| 6,463,811 | B1 * | 10/2002 | Putney | B25B 23/1427 73/862.21 |
| 6,928,885 | B1 * | 8/2005 | Shiao | B25B 23/1425 73/862.21 |
| 6,948,380 | B1 * | 9/2005 | Shiao | B25B 13/461 73/862.21 |
| 7,082,866 | B2 * | 8/2006 | Becker | B25B 23/1425 81/479 |
| 10,625,405 | B2 * | 4/2020 | Silha | B25B 21/004 |
| 10,792,795 | B2 * | 10/2020 | Lee | B25B 23/14 |
| 10,836,020 | B2 * | 11/2020 | King | B25G 1/063 |
| 11,338,416 | B2 * | 5/2022 | Hsieh | B25B 13/102 |
| 11,400,569 | B2 * | 8/2022 | Hsieh | B25B 23/1425 |
| 11,484,998 | B2 * | 11/2022 | Hsu | B25B 13/06 |
| 11,541,519 | B2 * | 1/2023 | Banzola | G06K 7/10366 |
| 11,565,388 | B2 * | 1/2023 | Hsieh | B25B 23/1425 |
| 11,583,985 | B2 * | 2/2023 | Hendel | B25B 23/1425 |
| 11,766,770 | B2 * | 9/2023 | Silha | B25B 13/10 81/52 |
| 2002/0152820 | A1 * | 10/2002 | Tsuji | B25B 23/14 73/862.21 |
| 2005/0061119 | A1 * | 3/2005 | Becker | B25B 23/1425 81/467 |
| 2010/0206141 | A1 | 8/2010 | Nakata et al. | |
| 2011/0100170 | A1 | 5/2011 | Chiapuzzi | |
| 2016/0279770 | A1 | 9/2016 | Yokoyama et al. | |
| 2018/0333831 | A1 * | 11/2018 | Lee | G01L 25/003 |
| 2020/0180126 | A1 * | 6/2020 | Hsieh | B25B 23/1425 |
| 2020/0180127 | A1 * | 6/2020 | Hsieh | B25B 23/1425 |
| 2020/0290186 | A1 * | 9/2020 | Hsieh | B25B 23/1425 |
| 2021/0146513 | A1 * | 5/2021 | Banzola | G06K 7/1413 |
| 2022/0193870 | A1 * | 6/2022 | Jiries | B25G 1/105 |
| 2022/0241942 | A1 * | 8/2022 | Blay | B25B 23/1425 |
| 2022/0266428 | A1 * | 8/2022 | Boccellato | B25B 23/1425 |
| 2022/0395969 | A1 * | 12/2022 | Boccellato | B25B 23/1425 |

FOREIGN PATENT DOCUMENTS

| | | | |
|---|---|---|---|
| DE | 20 2010 001 831 | U1 | 8/2010 |
| EP | 0 100 023 | A2 | 2/1984 |
| EP | 2 168 726 | A1 | 3/2010 |
| FR | 2 841 650 | A1 | 1/2004 |
| WO | WO 2009/115889 | A1 | 9/2009 |

OTHER PUBLICATIONS

International Preliminary Report on Patentability issued Dec. 7, 2021 in PCT/IB2020/062088 filed on Dec. 17, 2020, 10 pages.

* cited by examiner

CLAMPING TOOL WITH INTERCHANGEABLE ARM

BACKGROUND

The present invention refers to an electronic tool for the controlled clamping of mechanical members; such tool can be for example a torque wrench in which it is possible to check the tightening torque exerted on the bolt to be clamped.

Clamping tools are known in the art which comprise a body, containing the various control and, optionally, actuation members, to which one of several removable inserts is coupled, each of which is destined to engage a corresponding type of mechanical member (e.g. example, the head of a screw, with male or female coupling) on which the tool is destined to operate.

Electronic tools of this type comprise sensors, including a torque sensor, for detecting the torque exerted on the mechanical member and other quantities of interest, so as to allow a controlled clamping of the mechanical member by means of suitable processing means which show various parameters of interest to the operator and, if necessary, command the execution of the clamping operation.

Patent EP2326464 describes a tool of this type in the form of a torque wrench, which comprises a body, containing the control circuits and processing unit of the wrench, at one end a handle (advantageously containing rechargeable batteries for powering the wrench) and on the other end an arm. Advantageously, a display for visualizing information and operating data is provided on the body and a keyboard allows data and commands to be entered. A tool head which must be coupled with the type of mechanical member (for example, the head of a screw, with male or female coupling) on which the wrench is destined to operate is inserted interchangeably in a special seat at the end of the arm.

The sensors which measure the torque to be exerted on the member to be clamped are placed on the arm and comprise at least one strain gauge, which is a sensor whose electrical resistance varies with the deformation it undergoes; so it converts the force, pressure, voltage, weight, etc., into a variation in electrical resistance that can be measured.

The value of the torque exerted is normally available on the wrench display or is indicated near it by means of special light and/or acoustic signals.

The signals from the sensors on the arm are transmitted to the central processing unit on the body via electrical connectors (i.e. electrical wires). Then the sensor signal is transmitted to the central unit in analogic format and this almost certainly makes the measurement not without inaccuracies. Furthermore, wire transmission often involves the introduction of disturbances and noise into the signal, as well as any substantial executions of the signal itself, which could make the reading by the central processing unit unreliable. Furthermore, the breakage of these connectors would result in the breakage of the wrench and the need to replace the broken connector.

SUMMARY

The Applicant has solved these drawbacks by providing the arm of the tool with a microprocessor electronic card capable of digitizing the sensor signals and transmitting them to the central unit in digital format, by proposing a clamping tool having the characteristics recited in the claims.

BRIEF DESCRIPTION OF THE DRAWINGS

Further characteristics and advantages of the present invention will become clear from the following detailed description and the appended figures, provided solely by way of non-limiting example, wherein.

DETAILED DESCRIPTION

Figure 1:
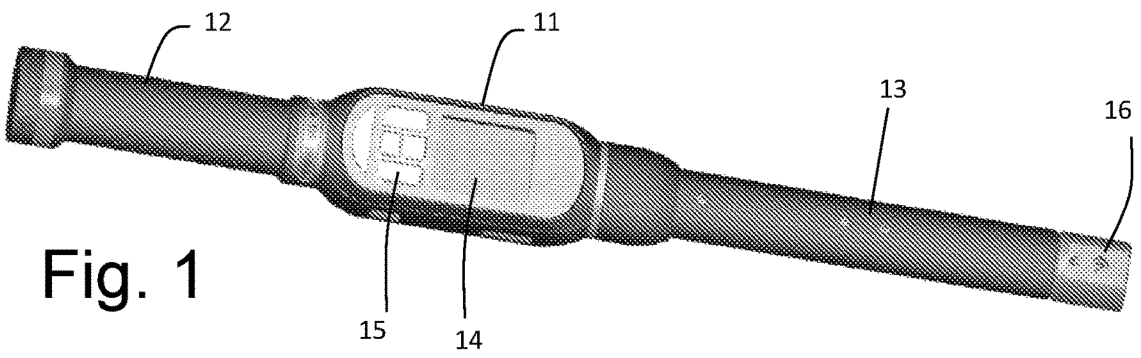
FIG. 1 is a perspective view of the clamping tool according to the present invention.
Figure 2:
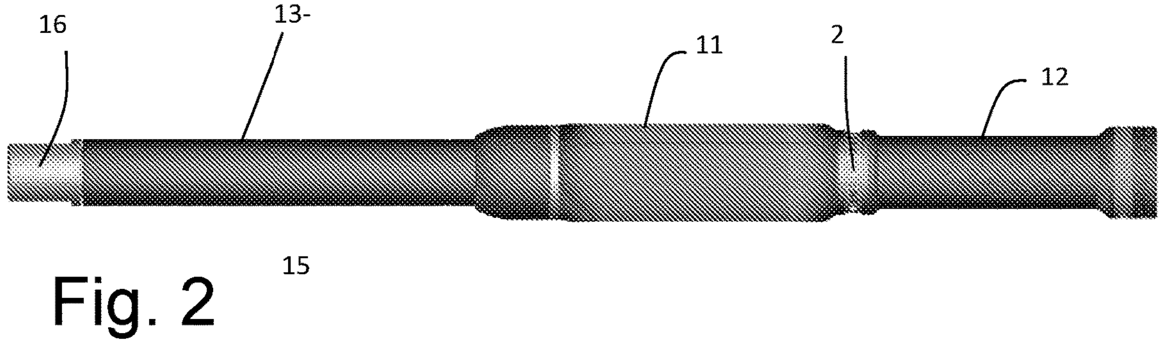
FIGS. 2 and 3 are front and rear views of the tool of FIG. 1.
Figure 3:
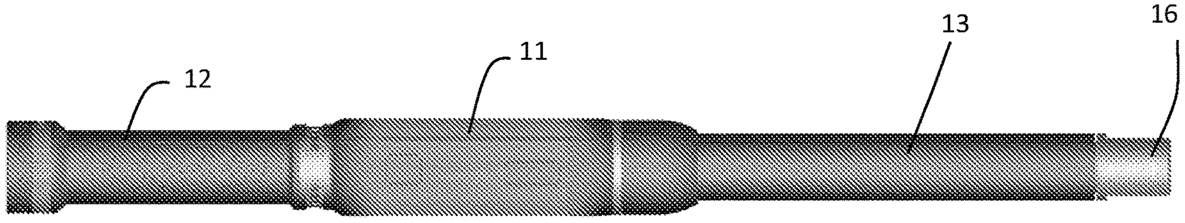

With reference to the aforementioned figures, the clamping tool according to the present invention is a torque wrench and comprises a body 11 containing electronic control circuits and a central processing unit having at one end of said body a handle 12 (preferably containing rechargeable batteries for powering the tool) and on the other end an arm 13. Advantageously, a display 14 for visualizing information and operating data is provided on the body 11 and a keyboard 15 allows data and commands to be entered.

Naturally, it is understood that if the processing or storage of data requires a unit which cannot be easily or completely contained in the body 11, the body 11 can be connected, by means of a cable or a wireless connection, to external processing units. A wired connection can also be envisaged to provide external power supply.

A plurality of inserts can be alternatively pluggable in a suitable seat 16 at the end of the arm 13. For example, each insert will be suitable for engaging the wrench with a corresponding type and/or dimension of mechanical member or element (screw, nut, etc.) on which the tool is destined to operate.

Although for simplicity's sake inserts having all a similar dimension are shown, elongated inserts or inserts with arms of particular shape can also be provided, as known in the art.

Each insert may comprise internally a transponder in a suitable position (typically in the plugging shank to the seat 16) to be coupled to a suitable antenna close to the seat 16 when it is mounted on the tool.

The manners for coupling between transponder and antenna for the activation of the transponder (usually known as "tag") and the communication are widely known and will therefore not be described in detail here.

The tool comprises sensor means for detecting the tightening conditions, for example sensors for the torque exerted on the mechanical member, made with groups of strain gauges arranged in the arm and possibly angle sensors by means of a gyroscopic for detecting the clamping angle.

According to an aspect of the present invention, a microprocessor electronic card is provided on said arm suitable for receiving analogic signals from said sensor means on the tightening conditions converting the same into digital format, making eventually a pre-processing and handling its transfer in digital format to the central processing unit.

Examples of pre-processing can be filtering of the signal, detections of the torque peaks, elimination of spurious data, analysis of linearity, angle/speed conversion, detection of the yield transducer status, management of the usage data and count of the clamping cycles.

This microprocessor electronic board is preferably powered by the tool's rechargeable batteries. Alternatively or in addition, this board has its own rechargeable batteries.

According to a further aspect of the present invention, the arm 13 is removably connected to the body 11 through a connector allowing both the mechanical connection and the transmission/reception of electrical and power supply signals between the two parts.

In this way, the electrical energy is supplied to the microprocessor electronic card through the connector and the signals can transit digitally along the arm and pass to the body and be received by the central electronic unit.

The fact that a first sensor processing takes place in the arm allows eventually to add further sensors whose signals in digital format can be transmitted together with the signals of the other sensors with no need to modify the tool, for which the expansion of the digital signal would be necessary. For example, a temperature and humidity sensor required by some regulations for calibrations might be added. An actuator might also be added and the arm could be used as if it were an electric screwdriver.

A mechatronic device capable of managing or simulating a click-wrench could be inserted into the arm. In addition, the wrench could be equipped with a sensor for geo-localization.

Advantageously, the sensor means and the electronic card are inserted in a single support inside the arm.

Furthermore, the possibility of storing information on the arm itself and also information relating to the tool head, which can then be transferred to the central electronic unit present on the body, favours the interchangeability of the arm itself. In fact, when an arm of the body is replaced with another one (for example having different dimensions), the information can be transferred directly to the central unit and the settings can be automatically modified if necessary, so that the measurement is automatically correct.

The invention claimed is:

1. A clamping tool, comprising:

a body including control circuits and electronic processing circuitry, and having, at one end, a handle for gripping by an operator making a clamping, and on an other end, an arm, the arm comprising, at a free end, a seat that can be alternatively pluggable to a plurality of inserts configured to engage the clamping tool with a corresponding type and/or dimension of a mechanical member on which the clamping tool is configured to operate to perform a clamping operation, a sensor provided in the arm and configured to detect tightening conditions exerted on the mechanical member, and a microprocessor electronic card provided in the arm and configured to receive analog signals from the sensor, convert the analog signals into a digital format, and transfer the signals in the digital format to the electronic processing circuitry of the body, wherein the arm is removably connected to the body through a connector allowing both a mechanical connection and transmission/reception of electrical and power supply signals between the arm and the body, and the sensor and the microprocessor electronic card are inserted in a single support inside the arm.

2. The clamping tool according to claim 1, wherein said microprocessor electronic card is further configured to perform filtering of the signals, and/or detection of torque peaks, and/or an elimination of spurious data, and/or an analysis of signal linearity.

3. The clamping tool according to claim 1, wherein the microprocessor electronic card is powered by rechargeable batteries of the clamping tool.

4. The clamping tool according to claim 1, wherein the microprocessor electronic card has rechargeable batteries.

5. The clamping tool of claim 1, further comprising another sensor provided in the arm and configured to detect at least one of temperature and humidity;

wherein the microprocessor electronic card is configured to receive signals from the another sensor, convert the signals into the digital format, and transfer the converted signals to the electronic processing circuitry; and the sensor, the another sensor, and the microprocessor electronic card are inserted in the single support inside the arm.

* * * * *